United States Patent
Hayashi

(10) Patent No.: US 8,567,710 B2
(45) Date of Patent: Oct. 29, 2013

(54) CABLE PROTECTION DEVICE

(75) Inventor: Masahiro Hayashi, Tokyo (JP)

(73) Assignee: Aero Asahi Corporation, Tokyo (JP)

( * ) Notice: Subject to any disclaimer, the term of this patent is extended or adjusted under 35 U.S.C. 154(b) by 730 days.

(21) Appl. No.: 12/678,814

(22) PCT Filed: Feb. 25, 2008

(86) PCT No.: PCT/JP2008/053145
§ 371 (c)(1),
(2), (4) Date: Mar. 18, 2010

(87) PCT Pub. No.: WO2009/037872
PCT Pub. Date: Mar. 26, 2009

(65) Prior Publication Data
US 2010/0213316 A1    Aug. 26, 2010

(30) Foreign Application Priority Data
Sep. 18, 2007  (JP) ................................ 2007-241538

(51) Int. Cl.
*B64D 9/00* (2006.01)
*B64C 27/04* (2006.01)

(52) U.S. Cl.
USPC ............... 244/17.11; 244/108; 244/118.1; 414/785

(58) Field of Classification Search
USPC .......... 244/17.11, 108, 118.1, 137.1; 414/785
See application file for complete search history.

(56) References Cited

U.S. PATENT DOCUMENTS

| | | | |
|---|---|---|---|
| 2,738,939 A | | 3/1956 | Johnson |
| 3,104,084 A | * | 9/1963 | Lovercheck ............... 244/100 R |
| 4,544,116 A | * | 10/1985 | Shwayder ..................... 244/108 |
| 6,488,236 B2 | * | 12/2002 | Landry ...................... 244/137.1 |

FOREIGN PATENT DOCUMENTS

| | | |
|---|---|---|
| CA | 2279768 | 2/2001 |
| DE | 3323513 | 1/1985 |
| GB | 2303837 | 3/1997 |
| JP | 63-104394 | 7/1988 |
| JP | 3084369 | 9/2000 |
| JP | 2000-318694 | 11/2000 |

\* cited by examiner

*Primary Examiner* — Rob Swiatek
(74) *Attorney, Agent, or Firm* — Hamre, Schumann, Mueller & Larson, P.C.

(57) ABSTRACT

A cable protection device is designed to prevent a cable from being damaged by rubbing against a helicopter. A protection frame is installed-below a winch 11 connected to a helicopter. A supporting groove is formed on the protection frame, and a slide-contact body is rotatably fitted in the support groove. A part of the slide-contact body is exposed, and the cable hung down from the winch is brought into contact with the exposed portion. The slide contact body is divided into two or more parts, and it is formed by continuously aligning the divided slide-contact bodies of the cylindrical shape. Both ends of the divided slide-contact body are aligned by fitting the recession and the projection of the tapers of the ends of the adjacent divided slide-contact bodies to each other.

9 Claims, 4 Drawing Sheets

CABLE PROTECTION DEVICE

FIELD OF THE INVENTION

The present invention relates to a cable protection device for preventing a cable and an airframe from being damaged by the unwound cable from a winch of a helicopter contacting the airframe.

A helicopter used for goods transporting or rescuing is equipped with a winch extending laterally from the upper part of the side of the airframe. A cable is unwound from the winch for hanging goods to transport or for hanging people to rescue with a hook at the lower end of the cable.

When the wind blows the cable with goods or people suspended, the cable sways and contacts the airframe. The cable and the airframe can be damaged by the friction when the cable is ascending or descending, which may finally cause serious danger of an accident due to cable cutting.

In order to suppress such damage of a cable and an airframe, it is conventional to attach shock absorbing materials such as metal guards or rubber cushions on the side of the airframe of a helicopter to reduce the shock between the cable and the airframe.

DESCRIPTION OF RELATED ART

As a cable protection structure, Document 1 is known.
A protection structure disclosed in Document 1 comprises a protection frame set on one of a pair of skids of a helicopter, which is the most extended part in the lateral direction, and a rubber tabular roll pivotally supported at the both ends by the protection frame to prevent a cable from being damaged due to the cable hitting against the tubular roll when the wind sways the cable and the tubular roll rotates during winding and unwinding the cable.

However, such conventional structure has difficulties in maintenance to replace shock absorbing materials such as metal guards or rubber cushions or tubular rolls. Further, neglecting replacing guards and using damaged guards lead to a danger of cable damaging.

Furthermore, guards or cushions tend to fall off depending on the attaching method, and the tubular roll pivotally supported at the both ends has difficulties in maintenance for proper rotating.

Document 1: Japanese Publication No. 2000-318694.

SUMMARY OF THE INVENTION

In conventional protection structures, the problems to be solved are troublesome replacement of guards or rubbers damaged by the cable hitting and long maintenance time for removable fixture in conventional protection structures. The objects of the present invention are to cut down the maintenance time for easy removable fixture and also to obtain steady cable protection effects on the cable for insuring against dropout by itself.

The present invention comprises:

setting a protection frame in a lateral direction of an airframe and below a winch equipped with a helicopter;

forming a supporting groove in said protection frame in a longitudinal direction of the airframe;

sliding and setting a column-shaped slide contact body into said supporting groove from the longitudinal direction; and exposing a part of said slide contact body via an open part of said supporting groove, which is outwardly open from the airframe in order that a unwound cable from said winch contacts the exposed part of said slide contact body.

Thus constituted, the cable contacts the exposed part of the slide contact body and only said exposed part is damaged, which prevents the airframe from damaged. Furthermore, since said slide contact body can be slid in the supporting groove it considerably reduces difficulty of maintenance for replacing the slide contact body, thereby reducing cable damage by damaging the slide contact body. Also, the slide contact body is the only part to be replaced, so less maintenance fees can be expected.

In the present invention, inner circumference of said supporting groove has a circular cross-section, and said column-shaped slide contact body is slid into from the longitudinal direction and rotatably fixed in.

Therefore, the slide contact body is rotatably fixed into the supporting groove, and, if anyone operate to wind or unwind the cable when a cable contacts the slide contact body, damage of the cable and the slide contact body can be suppressed by rotating of the slide contact body.

Furthermore, even though the strong forth is added to the diameter direction by a gust of wind, the slide contact body would not be bent because they are fixed into the supporting groove and they could assure proper rotating of the slide contact body.

Moreover, as the slide contact body is fixed into the supporting groove, which is outwardly open from the airframe of the helicopter, the crew of the helicopter are safe without any danger of slipping on the rotatable slide contact body.

In the present invention, a plurality of divided slide contact bodies are formed by dividing said slide contact body in predetermined length to be fixed in said supporting groove in linear series.

Therefore, by replacing the number of the divided slide contact bodies, the length of the slide contact body is easily adjustable, which enables to easily cover the whole length of the airframe of the helicopter, and also enables to greatly reduce the maintenance fees by replacing only the damaged slide contact body due to hit by the cable. Also, short divided slide contact bodies are easily storaged and a large amount of maintenance fees can be reduced.

In the present invention, concave and convex parts are formed respectively at the both ends of said divided slide contact bodies, and the concave and convex parts of the adjacent divided slide contact bodies are jointed and placed in linear series.

Therefore, the adjacent divided slide contact bodies can be placed by the concave and convex parts thereby preventing uneven joint between the next divided slide contact bodies, and also preventing the cable from breaking into between the divided slide contact bodies.

In the present invention, a taper-hole-shaped concave part and a conically-shaped convex part are concentrically formed at the both ends with each of the said divided slide contact bodies, and the adjacent divided slide contact bodies are jointed and placed in linear series.

Therefore, the adjacent divided slide contact bodies can be placed by the concave and convex parts without preventing the divided slide contact bodies from rotating thereby preventing uneven joint between the adjacent divided slide contact bodies, and also preventing the cable from breaking into between the divided slide contact bodies.

In the present invention, the material to form said slide contact body is softer than the material of said protection frame.

Therefore, even though the slide contact body and the protection frame have friction, wearing off of the protection frame is suppressed, which reduces frequency for replacing, difficulty and time for maintenance.

In the present invention, a through-hole is formed in the longitudinal direction of said slide contact body and a core material of the same length is inserted in the through hole said slide contact body.

Therefore, even though the slide contact body is worn off by use to the extent of dropping from the opening of the supporting groove, the slide contact body is supported by the core material preventing the slide contact body from dropping off from the supporting groove.

In the present invention, the both ends of said core material are fixed to said protection frame.

Therefore, even though the slide contact body is worn off by use to the extent of dropping from the opening of the supporting groove, the slide contact body is supported by the core material steadily preventing the slide contact body from dropping off from the supporting groove.

DETAILED DESCRIPTION

As follows, the embodiments in accordance with a helicopter equipped with this cable protection device are described in view of FIG. 1 to FIG. 12.

Figure 1:
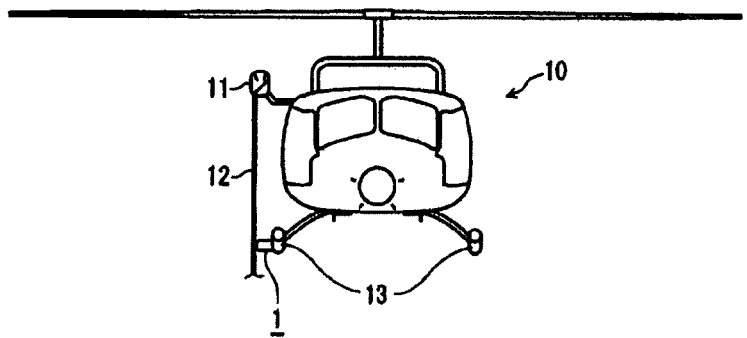
FIG. 1 is a front view of a helicopter which is equipped with a cable protection device according to the present invention.
Figure 2:
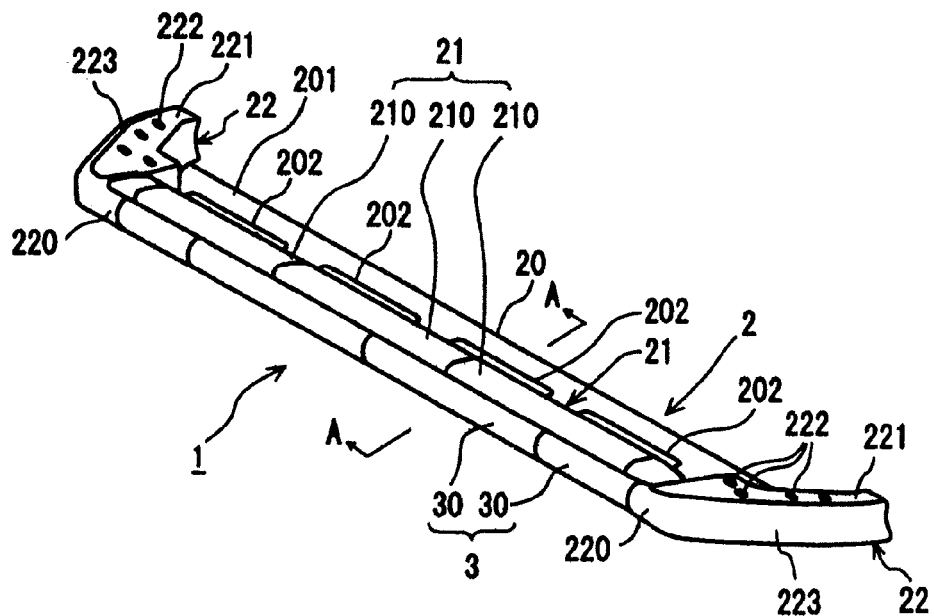
FIG. 2 is a whole perspective view of a cable protection device.

Firstly, a cable protection device according to the present application is described in views of FIG. 1 to FIG. 6. FIG. 1 is a front view of a helicopter equipped with a cable protection device and FIG. 2 is a whole perspective view of a cable protection device in the present invention.

A cable protection device 1 is attached to the most outward side where a cable 12 suspended from a winch 11 of a helicopter 10 can contact. As shown in the figure, the helicopter 10 is equipped with a pair of skids 13 and the cable protection device 1 is attached to one of the pair of skids 13 in the outwardly extended lateral direction.

FIG. 2 shows that a cable protection device 1 comprises a protection frame 2, which is horizontally long and is attached along the skid 13, and a column-shaped slide contact body 3 attached to the most outward part of the protection frame 2.

The protection frame 2 is described as follows. The protection frame 2 comprises a metal fixed base 20 fixed to the skid 13 by bolting or welding, a supporting body 21 attached to the fixed base 20 and constituting the most outward part of the protection frame 2, and a pair of retaining bodies 22 attached to the both ends of the supporting body 21.

Figure 3:
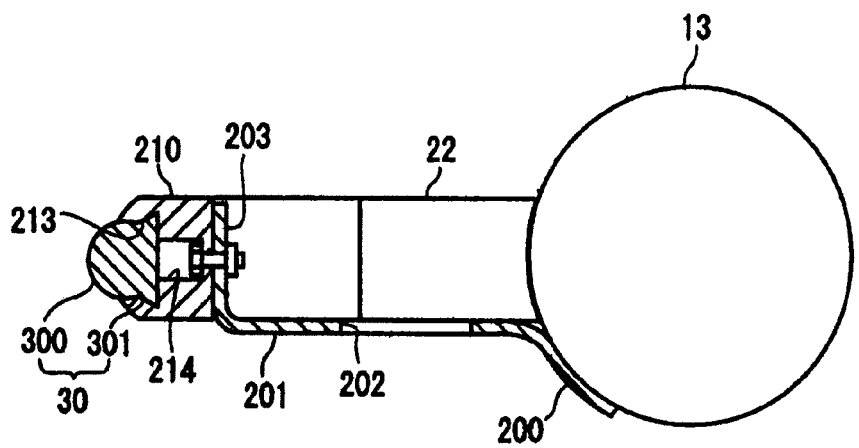
FIG. 3 is a sectional view of a cable protection device taken along line A-A of FIG. 2.

Next, the fixed base is described referring to FIG. 2 and FIG. 3. FIG. 3 is a side view section by A-A line of FIG. 2.

The fixed base 20 is a board formed of metal such as aluminum, and, as referred in FIG. 3, comprises fitting part 200 curved along the shape of the skid 13 to be fitted to the skid 13, a window part 201 in which a plurality of windows 202 are formed to obtain visibility for the driver of the helicopter 10, and an outer end part 203 bent in the vertical direction.

The fixed base 20 is fitted to the skid 13 by welding or bolting the fitting part 200 to the skid 13. Also, a plurality of bolt holes 204 are formed at the both ends in the longitudinal direction of the window part 201 to fix the pair of retaining bodies 22 to the fixed base 20. The bolt holes are also formed in the outer end part 203, and the supporting body 21 is attached to the most outward part.

Figure 4:
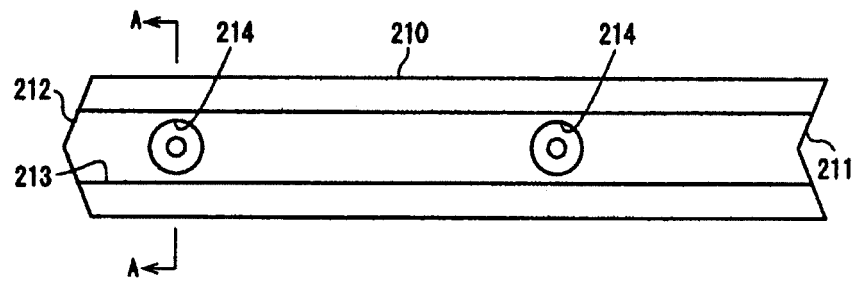
FIG. 4 is a front view of a supporting member.

Next, the supporting body and the comprised a plurality of supporting members are described with reference to FIG. 3 and FIG. 4. FIG. 4 is a front view of one of the plurality of supporting members.

The supporting body 21 comprises a plurality of supporting members 210. Each of the supporting members 210, referring to FIG. 4, has the slopes 211 and 212 in the shapes of concave or convex respectively formed at the both ends. Also, the supporting groove 213 is formed in front and covering the whole length of the supporting members 210. Each of the supporting members 210, referring to FIG. 3, of which the front side is a bow-shaped curved surface in section where the supporting groove 213 is formed in. In the Figure, the supporting groove 213 is formed in the shape of dovetail groove.

Said supporting members 210 with concave and convex slopes 211 and 212 at the both ends jointed are placed in linear series to constitute the supporting body 21. The supporting body 21 is attached to the outer end part 203 of the fixed base 20 with the curved surface facing outside and the open part of the supporting groove 213 formed in this curved surface is disposed outwardly long in the longitudinal direction of the airframe. In the figures, the supporting body 21 is fixed to the outer end part 203 by bolting the bolt hole 214 from the bottom part of the supporting groove 213.

Thus, by forming the supporting body 21 with a plurality of supporting members 210, the supporting body 21 can be set along the curve of the airframe as well as easily forming the supporting body 21 of necessary length to excel in versatility. Further, in case the supporting body 21 is damaged by the cable 12, only the damaged supporting member 210 can be replaced, which is advantageous with regard to maintenance costs. Furthermore, concave and convex slopes 211 and 212 are formed at the both ends of each of the supporting members 210, thereby preventing uneven joint between the adjacent supporting members 210.

Figure 5:
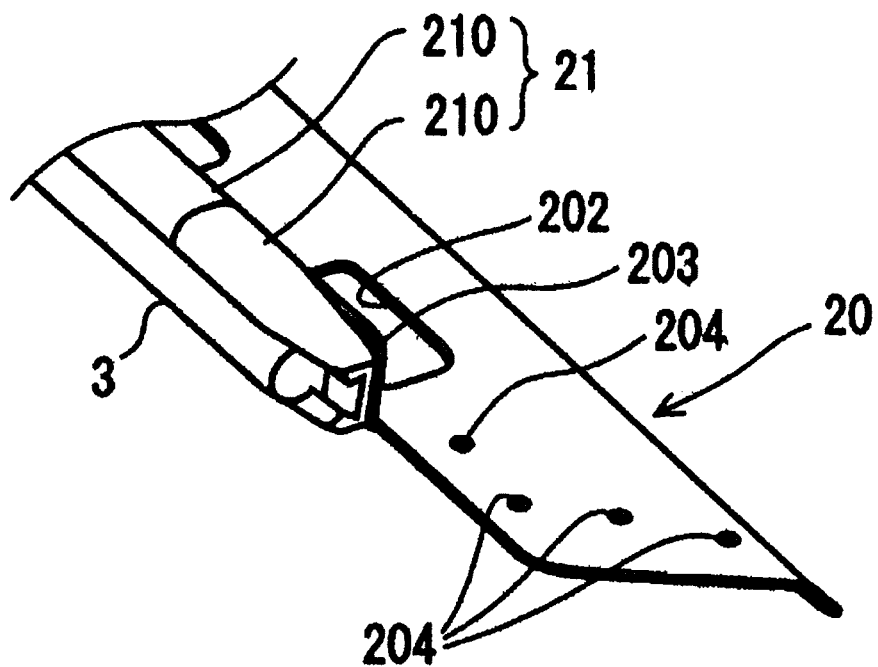
FIG. 5 is a perspective view of an enlarged substantial part of a cable protection device.

Next, a pair of retaining bodies 22 are described referring to FIG. 2 and FIG. 5, FIG. 5 is a perspective view of an enlarged end part of a cable protection device.

A pair of retaining bodies 22 are set at the both ends of the supporting body 21 attached to the fixed base 20. The retaining bodies 22 have inserting parts 220 respectively to be inserted into the supporting groove 213 of the supporting body 21 from the both ends. The inserting parts 220 are in the shapes that can be slid and fixed into the supporting groove 213, and convex or concave tapers are formed at the end to joint with the concave or convex parts at the both end of the divided slide contact body 30.

Also, the retaining bodies 22 respectively have attaching parts 221 with a plurality of oval holes 222 to be attached to the both ends of the fixed base 20. The oval holes 222 are formed in parallel to the longitudinal direction of the inserting parts 220, and by these oval holes 222, the retaining bodies 22 can be attached to the window part 201 with the bolt holes 204 in proper places.

A pair of circumferential parts 223 of the attaching parts 221 are smoothly curved surfaces continuous from the inserting parts 220. Also, the end parts of the circumferential parts 223 curve along the skid 13 of the helicopter 10 to contact or nearly contact the skid 13.

As the circumferential parts 223 of the attaching parts 221 are smoothly curved surfaces continuous from the inserting parts 220, it is possible to prevent the cable 12 from being caught by the cable protection device 1. It is also possible to reduce the danger of damaging the cable 12 in case the cable 12 misses the slide contact body 3 and hits the circumferential part 223, as the cable 12 naturally returns where it contacts the slide contact body 3. Also, if the end parts of the circumferential parts 223 curve along the skid 13 to contact or nearly contact the skid 13, it is further possible to reduce the danger of damaging the cable 12 by wedged between the attaching part 221 and the skid 13.

Figure 6:
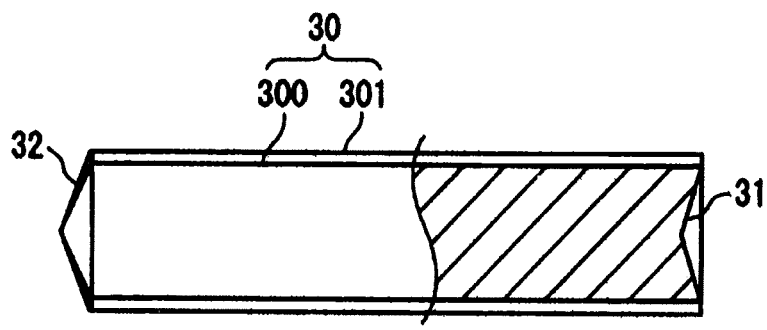
FIG. 6 is a fragmentary sectional front view of a divided slide contact body.

The following description is about the slide contact body and the comprised divided slide contact bodies referring to FIG. 6. FIG. 6 is a fragmentary sectional front view of one of the divided slide contact bodies.

The slide contact body 3 is comprised of dividing slide contact bodies 30 continuously placed in series as referred in FIG. 6. Each of the divided slide contact bodies 30 is column-shaped in the length of about 10~50 cm, and includes a column-shaped head part 300 exposed from the open part of the supporting groove 213, and an anchor part 301 to joint with the supporting groove 213 in the shape of dovetail groove. Also, the concave part 31 and the convex part 32 are formed at the both ends of each of the divided slide contact bodies 30. These divided slide contact bodies 30 are continuously placed joining the concave part 31 and the convex part 32 at the both ends to form the slide contact body 3 of the desired length. When forming the slide contact body 3, the divided slide contact bodies are slid and joined in sequence joining the concave part 31 and the convex part 32 from the end of the supporting groove 213 in the supporting body 21. The supporting groove 213 is formed in the shape of dovetail groove as shown in FIG. 3 and the divided slide contact bodies 30 can be slid in and joined in the longitudinal direction but cannot drop out in the depth direction of the groove. Each of the supporting members 210 comprised by the supporting body 21 is formed with the concave and convex slopes 211 and 212 at the both ends, and as between the adjacent supporting members is almost even, the divided slide contact bodies 30 are hardly caught when sliding and joining.

A part of the slide contact body 3 to be joined in the supporting groove 213 as the above described is exposed and extending sideway from the supporting body 21, and the cable 12 suspended from the winch 11 contacts this extending exposed part.

The slide contact body 3 where the cable 12 contacts is preferably formed with synthetic resin. It is not necessary to form the whole slide contact body 3 with synthetic resin; the exterior part can be formed with synthetic resin and interior part can be formed with metal and the like. Also, synthetic resin is preferred to form the supporting body 21 and the retaining body 22 with. Especially, the inserting part 220 of the retaining body 22 is recommended to be formed with synthetic resin of the same material with the slide contact body 3.

Further, the slide contact body 3 is preferred to be formed with softer material than that of the supporting body 21. Specifically, for example, the slide contact body 3 is formed with polytetrafluoroethylene and the supporting body 21 is formed with aramid resin.

Thus, by forming the slide contact body 3, the supporting body 21 and the retaining body 22 with synthetic resin, in case the cable 12 contacts the aforementioned, synthetic resin is softer thereby considerably suppressing damage of the cable 12. Also, safety for the crew and the workmen for replacing the slide contact body increases while the fear of being injured by the damaged slide contact body 3 decreases.

Also, preferably the slide contact body 3 and the supporting body 21 respectively comprise adjacent divided slide contact bodies 30, 30 and adjacent supporting members 210, 210 with their contacting lines crossed alternately. Constituted like this, the fear of the cable 12 breaking in between the divided slide contact bodies 30 and the supporting members 210 is further reduced.

The cable protection device constituted as above has effects described as follows.

A protection frame with a supporting groove set on the side of an airframe of a helicopter, and a column-shaped slide contact body for sliding and settling into said supporting groove from the longitudinal direction, wherein a part of said slide contact body is exposed from an open part of said supporting groove so that a swaying unwound cable from a winch contacts the exposed surface of said slide contact body thereby only said exposed surface being damaged.

Thus, only slide contact body is the part to be replaced, it is possible to reduce the maintenance fees for the cable protection device. Furthermore, as said slide contact body can be slid in the supporting groove, it is possible to reduce considerable costs and difficulties for maintenance.

As the slide contact body is constituted with a plurality of divided slide contact bodies lying in series, the length of the slide contact body is easily adjustable, that enables to easily cover the whole length of the airframe of the helicopter, and also enables to considerably reduce the maintenance fees by replacing only the damaged divided slide contact body.

As adjacent concave and convex parts formed respectively at the both ends of said divided slide contact bodies are joined and placed in linear series, if the cable is pushed into the slide contact body, the gap between the adjacent divided slide contact bodies in the aspect is prevented as well as preventing the cable from breaking in between the divided slide contact bodies.

Another embodiment of a supporting body with a supporting groove is described as follows referring to FIG. 7 to FIG. 9.

Figure 7:
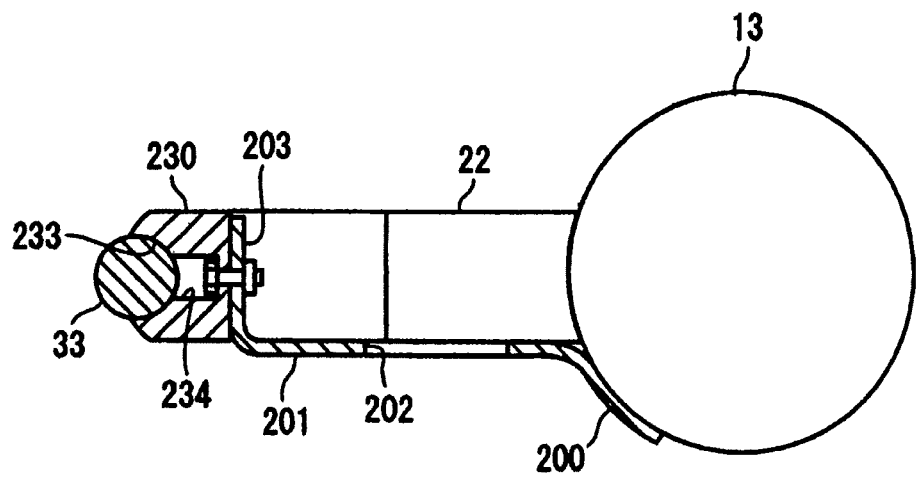
FIG. 7 is a side view of the second embodiment of a supporting groove in section.

Firstly, the second embodiment of a supporting body with a supporting groove is described as follows referring to FIG. 7, FIG. 7 is a side view in section showing the second embodiment of a supporting body with a supporting groove.

The supporting body of the present embodiment is constituted with a plurality of supporting members 230. Concave or convex slopes or tapers (not shown) are respectably formed at the both ends of each of the supporting members 230 forming the supporting groove 233 covering the whole length in front.

The front of a supporting member 230, as shown FIG. 7, is a bow-shaped curved surfaced in section and the supporting groove 233 is formed in this curving surface. The supporting groove 233 has a circle-shaped outline in section. This circle-shaped outline is formed with the center angle more than 180° while the center angle of the open part of the supporting groove 233 is less than 180° so that the slide contact body 33 can be slid and joined in the longitudinal direction but cannot drop out in the depth direction of the groove. When the slide contact body 33 is fitted in, a part of the circumference surface of the slide contact body 33 is exposed from the open part of the supporting groove 233.

Said supporting members 230 of which concave and convex parts at the both ends are joined and placed in linear series to constitute the supporting body. The supporting members 230 are attached to the outer end part 203 of the fixed base 20 in the longitudinal direction of the airframe with each curved surface facing outside and with each opening part of the supporting groove 233 formed in the curved surface disposed outwardly. In figure, the supporting members 230 are fixed to the outer end part 203 by bolting the bolt holes 234 from the bottom part of the supporting groove 233 of the supporting members 230.

Next, the slide contact body 33 fitted to the supporting groove of the present embodiment is described. The slide contact body 33 is constituted with a plurality of divided slide contact bodies. Each of the divided slide contact bodies is formed about 10~50 cm in length and in the shape of a column. At the both ends of the each divided slide contact bodies, taper-hole-shaped concave part and taper-shaped convex part are respectably formed. These divided slide contact bodies are placed in series as the concave and convex at the both ends are joined to form a slide contact body 33 of desired length.

Figure 8:
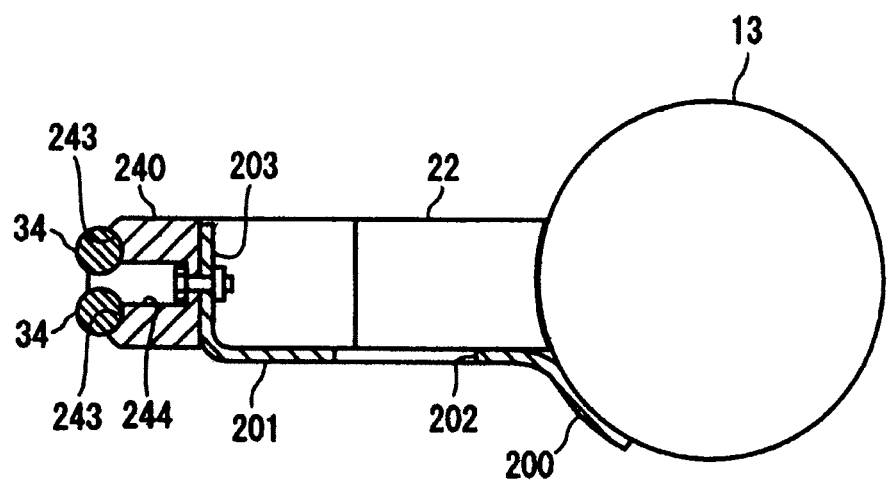
FIG. 8 is a side view of the third embodiment of a pair of supporting grooves in section.
Figure 9:
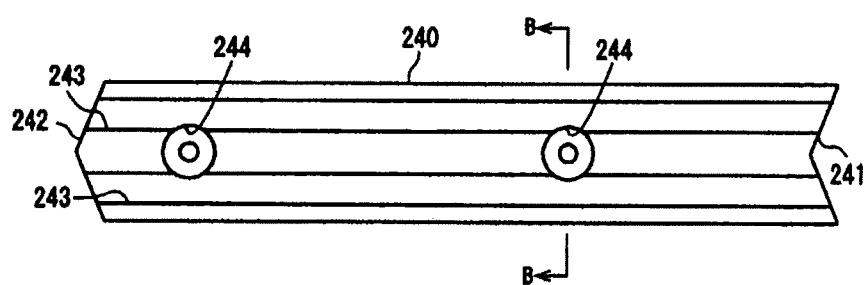
FIG. 9 is a front view of the supporting member with a pair of supporting grooves according to the third embodiment.

Next, the third embodiment of a supporting body with a pair of supporting grooves is described referring to FIG. 8 and FIG. 9. FIG. 8 is a side view of the third embodiment of a pair of supporting grooves in section, and FIG. 9 is a front view of a supporting member with a pair of supporting grooves according to the third embodiment.

A supporting member 240, as shown in FIG. 8, is a bow-shaped curving surfaced in section and a pair of supporting grooves 243, 243 are formed up and down in this curving surface. The supporting grooves 243, 243 have circle-shaped outlines in section. Each of the up and down supporting grooves has circle-shaped outline with the center angle more than 180° while the center angle of the open part of the supporting groove 233 is less than 180° so that slide contact body 34 can be slid in and joined from the longitudinal direction but the slide contact body 34 cannot drop out in the depth direction of the groove. When the slide contact body 34 is fitted in, a part of the circumference surface of the slide contact body 34 is exposed from the open part of the supporting groove 243.

The bolt holes 244 to fix the supporting members 240 are formed between the both supporting grooves 243, 243 and by bolting through these holes, the supporting members 240 are fixed to the outer end part 203.

Although the above embodiments of cable protection devices describe supporting bodies with one or two (up and down) supporting groove(s), it is possible to form more than two supporting grooves.

The cable protection devices as above composed have effects as follows.

By forming the supporting groove(s) with circle-shaped outline(s) in the supporting body, where the column shaped slide contact body is fitted in to be pivotally supported in the state of a part of the circumference surface exposed and extending sideway from the supporting body, the cable contacts the slide contact body. Even though the strong forth is added when the cable is swayed by the wind, the slide contact body remains unbent and even if the cable is wound or unwound, the slide contact body rotates suppressing the damage of the cable so that safety and workability are expected to increase.

Also, as the rotating slide contact body is not exposed on the upper side of the cable protection device, safety is assured without any danger of the crew of the helicopter stepping and slipping on the slide contact body.

By forming a plurality of divided, slide contact bodies in series, it is possible to obtain the slide contact body of necessary length easily. Also, as only the divided contact body contacting the cable rotates, the friction between the divided slide contact body and the supporting body is reduced so that the divided slide contact body can properly rotate to obtain enough cable protection effects.

Further, even if the slide contact body is damaged, it is possible to replace only the damaged part reducing the maintenance costs.

By forming the both ends of the divided slide contact bodies in series taper-shaped, and by placing the adjacent divided slide contact bodies with taper-shaped concave and convex parts joined, it is possible to avoid the unevenness between the adjacent divided slide contact bodies by strongly pushed into the cable, without preventing the rotating movement of the divided slide contact bodies in series. Further, it is possible to prevent the cable from breaking in the gap between the divided slide contact bodies in series as there is no such gap.

The material to form said slide contact body is softer than the material of said supporting body protection frame. Therefore, the supporting body is not worn off due to the friction of the rotating slide contact body, which reduces frequency for replacing the supporting body and difficulties for maintenance for such replacing.

Figure 10:
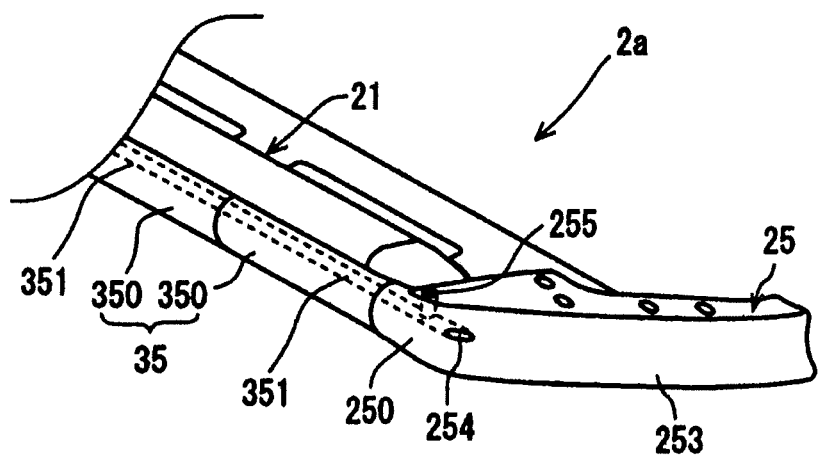
FIG. 10 is a fragmentary enlarged perspective view of another embodiment of an cable protection device.
Figure 11:
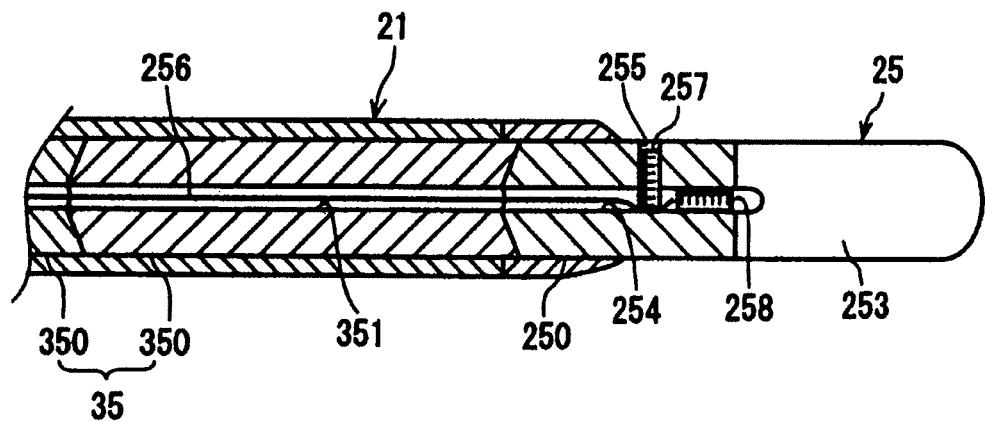
FIG. 11 is a fragmentary sectional front view of another embodiment of an cable protection device in section.

Next, another embodiment of a protection frame is described as follows referring to FIG. 10 and FIG. 11. FIG. 10 is a fragmentary enlarged perspective view of another embodiment of a protection frame and FIG. 11 is a fragmentary sectional front view of another embodiment of a protection frame.

The protection frame 2a in the present embodiment has different configuration in the retaining body 25 with the above described embodiments. In the retaining body 25 of the present embodiment, an inserting hole 254 is formed from the inserting parts 250 through the supporting body 21 to the circumference parts 253. The inserting hole 254 is formed in a diameter of several mm to about 10 mm and with screw cuttings near the open parts. Also, retaining holes 255 from the upper surface of the retaining body 25 to the inserting hole 254 is formed also with screw cuttings near the open parts.

Further, in the present embodiment, a through-hole 351 through the divided slide contact bodies 350 comprised by the slide contact body 35 is formed. The diameter of the through-hole 351 is from several mm to about 10 mm. Said through-hole 351 is formed in the same position of each divided slide contact bodies 350 making the divided slide contact bodies 350 placed in series so that the through-hole 351 can go through end-to-end of the slide contact body 35, in case the slide contact body is column-shaped, the through-hole is formed in the center of the column not to prevent rotating of the slide contact body.

Said through-hole 351 is formed in the position where the inserting hole 254 of the retaining body 25 can also go through, and a core material 256 is inserted from the inserting hole 254. The core material 256 is in the length that can go through the slide contact body 35, and worm screws 258 and the like are screwed together in the screw cuttings formed near the open parts of the inserting hole 254 to fill the inserting hole 254 for preventing the slide contact body 35 from escaping. Further, worm screws 257 are screwed in retaining holes 255 to stop the both end parts of the core material 256 with the worm screws 257.

As a core material, piano line, stainless wire, metal stick or the like can be used. In case a core material such as metal stick or stainless wire in large diameter with enough rigidity is used, there is no need of screwing the retaining holes 255 to stop the both end parts of the core material, and only filling the inserting holes 254 with the worm screws 258 is sufficient.

The cable protection device constituted as above has effects described as follows.

The through-hole is formed in the longitudinal direction of said slide contact body and the core material of the same length to be inserted for sticking through said slide contact body. Therefore, even though the slide contact body is worn off by use the slide contact body is supported by the core material preventing the slide contact body from dropping off from the supporting groove, and the fear of serious accident such as the slide contact body dropping off in the air is cleared.

The above referenced helicopter 10 is equipped with a pair of skids and as the pair of skids are the most outwardly extended parts, the cable protection device 1 is attached to one of the pair of skids 13. However, in case the airframe itself is the most outwardly extended, the cable protection, device 1 is attached to the airframe itself.

Figure 12:
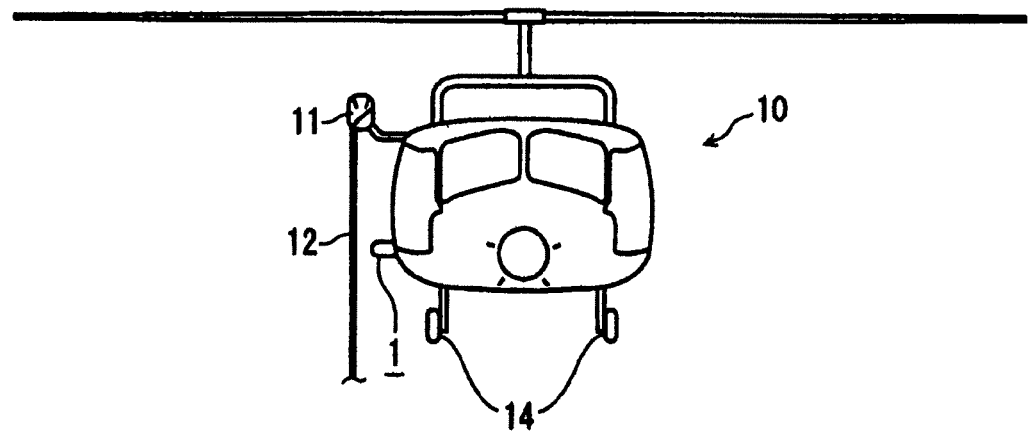
FIG. 12 is a front view of another helicopter which is equipped with a cable protection device according to the present invention.

For example, as shown in FIG. 12, if the helicopter 10 is equipped with a pair of wheels as landing gear, the cable protection device 1 is attached to the aspect of the airframe of the helicopter 10. Here, FIG. 12 is a front view of another helicopter which is equipped with a cable protection device.

COMMERCIAL APPLICABILITY

The cable protection device according to the present invention is applicable to be disposed along an edge part of a rooftop of a building preventing the damage of a cable unwound from a winch on the rooftop from contacting the angled edge of the rooftop when cleaning windows or outer walls of a building instead of attached to an airframe of a helicopter as described above.

Also, when mooring a ship to a landing bridge, the cable protection device is applicable to be disposed along an edge part of a landing bridge preventing damage of a rope for mooring a ship from contacting the landing bridge.

In case the cable protection device according to the present invention is applied to a landing bridge, it is effective, as well as increasing safety effects by preventing a rope from damaged, to decrease the necessary power for pulling the mooring rope so that the loads of workmen are reduced.

A LIST OF REFERENCE NUMBERS 1 cable protection device
10 helicopter
11 winch
12 cable
13 skid
14 tire
2, 2a protection frame
20 fixed base
200 fitting part
201 window part
202 window
203 outer end part
204 bolt holes
21, 23, 24 supporting body
210, 230, 240 supporting member
211, 212, 231, 232 slope
213, 233, 243 supporting groove
214, 234, 244 bolt holes
22, 25 retaining body
220, 250 inserting part
221, 251 attaching part
222, 252 oval holes
223, 253 circumferential part
254 inserting holes
255 retaining holes
256 core material
257, 258 worm screws
3, 33, 34, 35 slide contact body
30, 350 divided slide contact body
300 head part
301 anchor part
31 concave part
32 convex part
351 through-hole

The invention claimed is:

1. A cable protection device for use with a structure having a structure frame, said structure frame being connected to a winch and a cable wound thereon, comprising:
 a protection frame located below the winch in a lateral direction of the structure frame;
 a supporting groove formed in said protection frame in a longitudinal direction of the structure frame and having an open part facing outward from the structure frame;
 a column-shaped slide contact body placed into said supporting groove wherein,
 a part of said slide contact body is exposed in order that an unwound portion of the cable from said winch contacts the exposed part of said slide contact body.

2. A cable protection device according to claim 1 wherein the supporting groove has an inner circumference which further comprises a circular cross-section into which the column-shaped slide contact body is placed.

3. A cable protection device according to claim 1 wherein the slide contact body is made up of a plurality of divided slide contact bodies, and each divided slide contact body is of a predetermined length to be placed in said supporting groove in linear series.

4. A cable protection device according to claim 3 wherein the divided slide contact bodies further comprise concave and convex parts respectively at both ends such that the concave and convex parts of the adjacent divided slide contact bodies are joined and placed in the linear series.

5. A cable protection device according to claim 4 wherein the concave part is taper-hole shaped and the convex part is conically-shaped.

6. A cable protection device according to claim 1 wherein the slide contact body is comprised a material that is softer than the material of said protection frame to protect the supporting groove from wear due to the friction of the slide contact body.

7. A cable protection device according to claim 1 further comprising a through-hole formed in the longitudinal direction of said slide contact body, and a core material of the same length as the through-hole located inside the through-hole.

8. A cable protection device according to claim 7 wherein both ends of said core material are fixed to said protection frame.

9. A cable protection device for use with a helicopter having an airframe, said airframe connected to a winch and a cable wound thereon, comprising:

a protection frame located below the winch in a lateral direction of the airframe;
a supporting groove formed in said protection frame in a longitudinal direction of the airframe and having an open part facing outward from the airframe;
a column-shaped slide contact body placed into said supporting groove from the longitudinal direction, wherein
a part of said slide contact body is exposed in order that an unwound portion of the cable from said winch contacts the exposed portion of said slide contact body.

* * * * *